United States Patent [19]
Ketchum

[11] 3,933,012
[45] Jan. 20, 1976

[54] TORQUE ABSORBER FOR SUBMERGIBLE PUMPS

[75] Inventor: Lewis A. Ketchum, Bartlesville, Okla.

[73] Assignee: TRW Inc., Cleveland, Ohio

[22] Filed: July 13, 1973

[21] Appl. No.: 378,947

[52] U.S. Cl............................ 64/23; 64/14; 64/27 R; 403/225
[51] Int. Cl.² ............................................ F16D 3/06
[58] Field of Search .......... 64/14, 27 NM, 23, 27 R, 64/11 R; 403/225; 417/414

[56] References Cited
UNITED STATES PATENTS

| | | | |
|---|---|---|---|
| 2,564,826 | 8/1951 | Yoder | 64/27 R |
| 2,764,003 | 9/1956 | Croset | 64/14 |
| 2,849,871 | 9/1958 | Moeller | 64/27 R |
| 3,183,684 | 5/1965 | Zeidler | 64/23 |
| 3,645,114 | 2/1972 | Shepard | 64/14 |

FOREIGN PATENTS OR APPLICATIONS

| | | | |
|---|---|---|---|
| 760,475 | 3/1954 | United Kingdom | 64/14 |
| 958,116 | 5/1964 | United Kingdom | 64/23 |

Primary Examiner—Samuel Scott
Assistant Examiner—Randall Heald
Attorney, Agent, or Firm—Shapiro and Shapiro

[57] ABSTRACT

A compact torque absorber is provided to absorb the reaction torque of a submergible pump upon discharge tubing which supports the pump. The torque absorber comprises inner and outer tubular members having outwardly directed and inwardly directed interdigitated projections, respectively, which are spaced apart circumferentially for receiving torque absorbing elements therebetween, the tubular members being relatively rotatable to a limited extent. The outer member has an internal annular collar at one end through which the inner member extends and which supports a fluid seal. The projections of the outer member extend upwardly from the collar and carry a thrust ring upon their upper ends. An external annular collar of the inner member provides an annular shoulder spaced from the thrust ring. Ball bearings are provided between the thrust ring and the shoulder. Additional seals at the external collar of the inner member isolate the thrust bearing from the pumped fluid. A retainer ring prevents axial separation of the inner and outer members.

13 Claims, 3 Drawing Figures

TORQUE ABSORBER FOR SUBMERGIBLE PUMPS

BACKGROUND OF THE INVENTION

This invention relates to torque absorbers and is particularly concerned with an improved torque absorber on the discharge tubing of a submergible pump.

Submergible pumps of the centrifugal type are commonly employed to pump oil or other liquids from wells, for example, and in one type of installation the pump and its rotary motor are supported upon tubing which constitutes the discharge conduit of the pump. The reaction torque associated with the turning of the rotor of the motor and the impeller of the pump tends to cause the tubing to turn about its axis, placing stresses upon one or more threaded tubing joints close to the pump. In order to minimize such stresses and to protect the joints, and for other reasons, particularly with short discharge tubing of insufficient length to absorb the reaction torque, it has been proposed to employ a motor torque-absorber as disclosed, for example, in the copending application of Zehren, Ser. No. 175,634, filed Aug. 27, 1971. The Zehren torque absorber employs a stack of torque absorbing rings which are held between annular plates extending externally of associated tubular members capable of limited relative rotation, the plates being loosely connected by bolts which adjust the pressure on the rings. There are occasions when it is desired to provide metal-to-metal thrust bearing surfaces, which are not provided in the Zehren device, and when it is necessary to provide a torque absorber of smaller diameter than the Zehren device without restriction of the discharge flow passage. It is also desirable to minimize external protrusions, to eliminate the need for torque setting, and to reduce complexity. Although flexible couplings, torque cushioning devices and the like of various types and configurations are well known, as disclosed, for example in U.S. Pat. Nos. 919,767; 2,477,175; 2,806,365; 3,517,754; 1,552,892; 2,621,493; 2,849,871; 1,636,262; 2,703,991; 2,891,395; 1,850,210; 2,764,003; 3,183,684; such devices are not capable of providing the desired characteristics in a motor torque absorber for a submergible pump.

SUMMARY OF THE INVENTION

It is accordingly an object of the present invention to provide an improved motor torque absorber for a submergible pump.

A further object of the invention is to provide a device of the foregoing type having an outer diameter which does not appreciably exceed the outer diameter of discharge tubing supporting the pump, yet which does not unduly restrict the inner diameter of the discharge conduit, thereby permitting efficacious use of the device in slim-hole wells.

Another object of the invention is to provide a device of the foregoing type having permanent metal-to-metal thrust bearing surfaces which position parts of the device with precision and which provide positioning which does not deteriorate with wear.

Another object of the invention is to provide an improved torque absorber which is simpler in construction and easier to manufacture than comparable devices.

Briefly stated, in accordance with the present invention a torque absorber is provided which comprises inner and outer tubular members having interdigitated projections which are spaced circumferentially to receive torque absorbing elements therebetween. The inner member extends through an internal annular collar at one end of the outer member, which is provided with a fluid seal. The interdigitated projections are embraced between that collar and an external annular collar at one end of the inner member, a thrust bearing is provided between the upper end of the projections of the outer member and the lower surface of the external annular collar, additional fluid seals being provided at the external collar. A retainer ring prevents axial separation of the tubular members.

BRIEF DESCRIPTION OF THE DRAWINGS

The invention will be further described in conjunction with the accompanying drawings, which illustrate preferred and exemplary embodiments, and wherein.

DETAILED DESCRIPTION OF THE INVENTION

Figure 1:
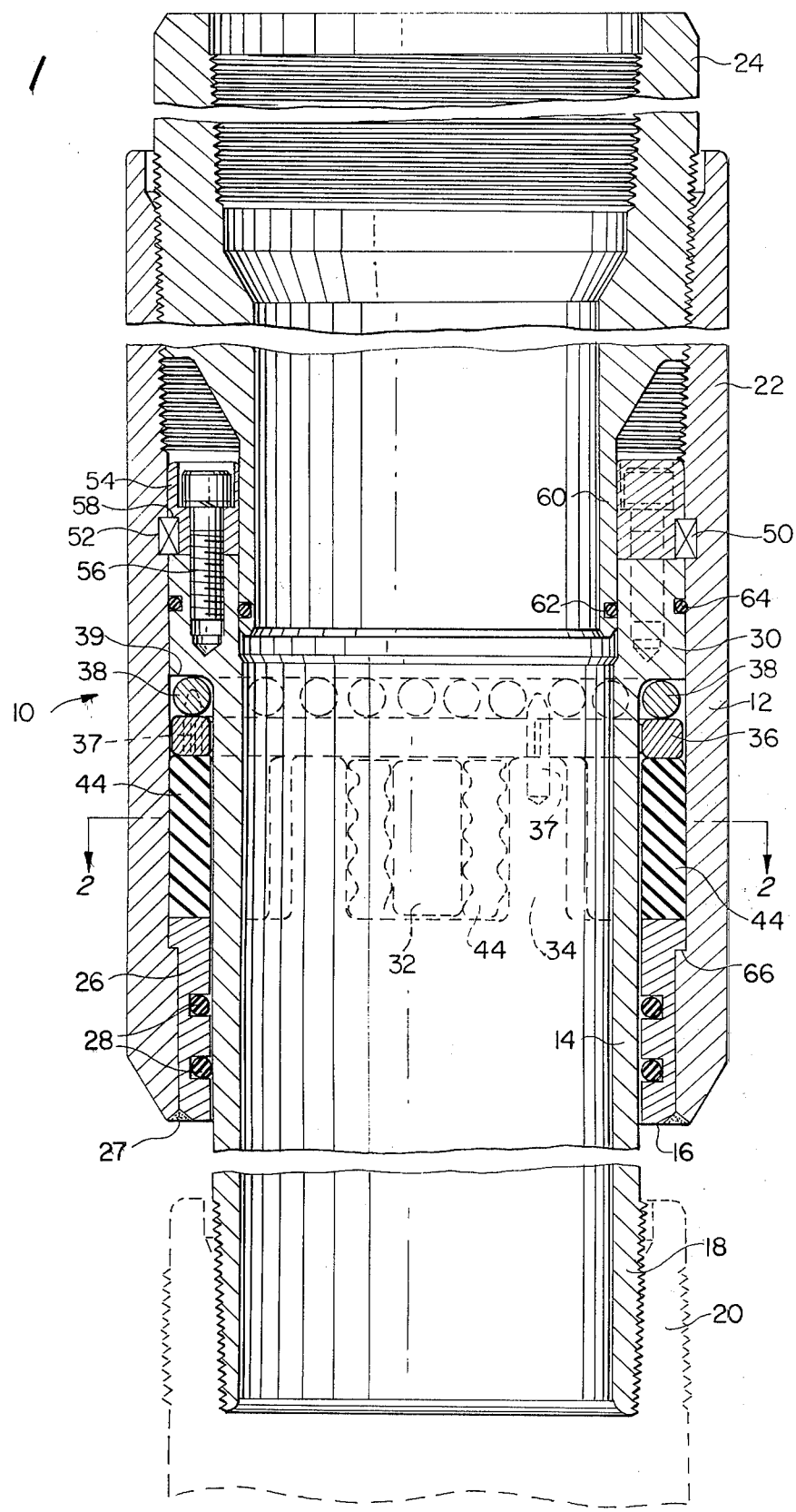
FIG. 1 is a longitudinal sectional view, taken approximately along line 1—1 of FIG. 2, of a torque absorber in accordance with the invention.

Referring to the drawings, and initially to FIG. 1 thereof, a motor torque absorber 10 in accordance with the invention comprises an outer tubular member 12 and an inner tubular member 14, both of which are generally cylindrical. When the components of the torque absorber 10 are assembled as shown in FIG. 1, the inner member 14 extends through the lower end 16 of the outer member. The lower end 18 of the inner member may be threaded into the upper end 20 of an extension of the discharge head of a submergible pump (not shown) which is driven by a rotary motor (not shown) in a conventional manner. The upper end 22 of the outer member may be coupled by threads to a reducing adapter 24 which in turn is coupled to another portion of the discharge tubing or to a well head, for example, from which the pump installation is suspended, as shown in U.S. Pat. No. 2,270,666, for example. The lower end of the outer member 12 has an internal annular collar 26 fixed thereto as by a weld 27. The collar engages the inner member 14 and is provided with O-ring fluid seals 28. The upper end of the inner member 14 is provided with an integral external annular collar 30 spaced from collar 26 and engaging the inner surface of the outer member 12.

Figure 2:
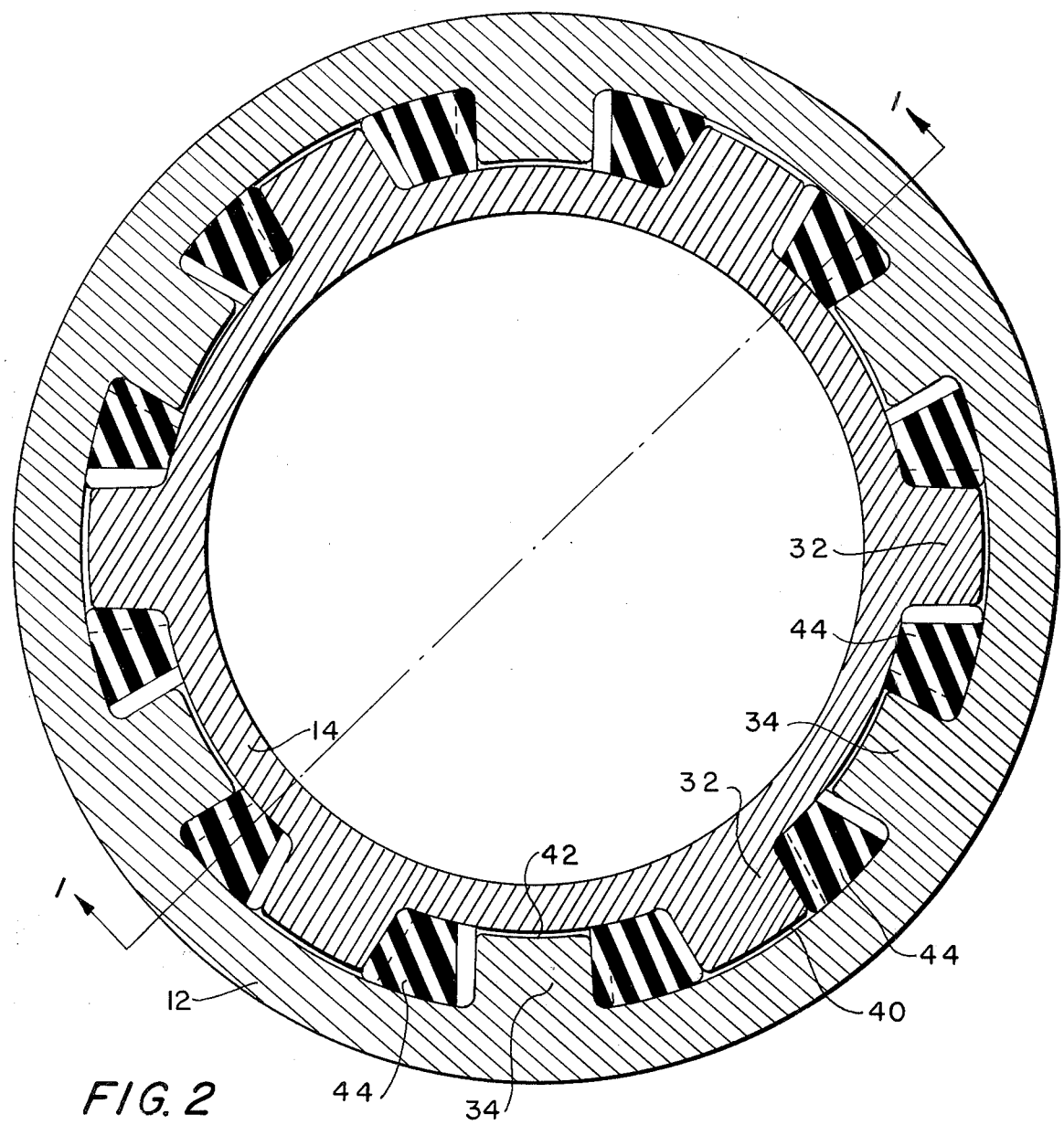
FIG. 2 is a horizontal sectional view taken along line 2—2 of FIG. 1.

The inner member 14 has a series of circumferentially spaced integral projections 32 which radiate outwardly from the outer cylindrical surface of member 14. See FIG. 2. The outer member has a series of circumferentially spaced integral projections 34 which extend upwardly from collar 26. A two-piece thrust bearing ring 36 is supported upon the upper ends of projections 34 and is fixed for movement therewith by a pair of stop pins 37 extending upwardly from a pair of diametrically opposite projections 34, the ring being split at each of the pins. Ball bearings 38 are provided between ring 36 and an annular shoulder 39 of collar 30 to form a thrust bearing by which the weight of the pump etc. upon inner member 14 is transmitted to the outer member 12. The outer surfaces 40 of the projections 32 of the inner member are cylindrical, and the inner surfaces 42 of the projections 34 of the outer member are cylindrical, each of such cylindrical surfaces being juxtaposed with a mating cylindrical surface of the other member as shown in FIG. 2.

Figure 3:
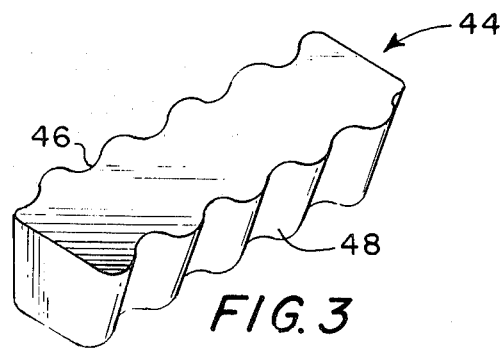
FIG. 3 is a perspective view of a torque absorbing element employed in the invention.

In the spaces between the interdigitated projections, torque absorbing elements 44 are located. One form of torque absorbing element is shown in FIG. 3, comprising a block of resiliently compressible material, such as synthetic (Buna-N) rubber. Opposite faces 46 and 48 of elements 44 which engage the projections 32 and 34 may be corrugated as shown to provide room for the material to "flow". Other types of torque absorbing elements, such as sinuous leaf springs, may be employed instead of the blocks shown. The axial length of the projections 32 and 34 and the torque absorbing elements 44 is somewhat greater than the radial depth thereof to provide adequate size without excessive radial projection.

To prevent axial separation of the inner and outer tubular members tending to disengage the associated thrust bearing surfaces a retainer is provided. In the form shown the retainer comprises a split ring 50 which is seated in a circumferential groove 52 formed on the inner surface of the outer member 12. The retainer ring engages the upper end surface of collar 30 and is held in position by a cap ring 54 detachably connected to the upper end of collar 30 by screws 56. The cap ring 54 has a circumferential groove 58 which accommodates split ring 50.

The adapter 24 has a depending sleeve 60 which fits within collar 30 and cap ring 54. O-rings 62 and 64 are provided between collar 30 and sleeve 60 and outer member 12 to isolate the thrust bearing from pumped fluid.

To assemble the invention, the halves of the thrust ring 36 are brought together around inner member 14 and are temporarily supported on the top of projections 32 of the inner member. Balls 38 are coated with grease and inserted between ring 36 and shoulder 39, the grease helping to hold the balls in position when inserted. Collar 26 is press fit into outer member 12, seated at shoulder 66, and welded to the outer member at 27 and also at the top of projections 34, which may be integral with collar 26 and chamfered at the top to receive the weld. (Elements 12, 26 and 34 could, of course, be integral.) Torque absorber elements 44 are then positioned upon collar 26 and held against the sides of projections 34 by grease. Then the inner and outer members are telescoped, each of projections 32 of the inner member entering between a pair of torque absorber elements 44, and pins 37 (previously seated in corresponding projections 34) entering openings in ring 36. Ring 36 becomes seated on the top of projections 34, and projections 32 may have clearance with respect to ring 36 and also with respect to the arcuate surfaces between projections 34 at their bottom. Rings 50 and 54 are inserted and secured, and finally adapter 24 is threaded into end 22 of the outer member.

By virtue of the invention, the reaction torque developed by the pump motor is absorbed in the torque absorbing elements by limited relative rotation of the inner and outer tubular members without applying significant stresses to threaded couplings of the discharge tubing, even if the discharge conduit is quite short. The torque absorber is capable of absorbing the torsional stress of horsepowers in the 400 to 500 hp range, despite the fact that the length dimension is rather small. The inner diameter is large enough to accommodate the required flow rates, e.g., 1000 gallons per minute. The outer diameter is sufficient to accommodate large torsional stresses and yet is not sufficiently greater than the inner diameter to create problems in slim-hole wells. Typically, the outer member 12 is 12¾ inches long, and the inner member 14 extends 6½ inches below the outer member. The total length from the top of adapter 24 to the bottom of inner member 14 may be 22½ inches. The O.D. of the outer member 12 may be 7.65 inches and the I.D. 6.62 inches. The I.D. of collar 26 may be 5½ inches, and the I.D. of the inner member 14 may be 4.77 inches. The projections 32 and 34 (of which there may be six each equally spaced) may have a length of 2½ inches, a radial depth of 0.6 inch and a width of ⅞ inch. The torque absorbing elements 44 may be 2¼ inches long, 9/16 inch deep (radially) and ⅞ inch wide. Torque settings are not required for proper compression of the torque absorber elements (which provide relatively rigid connection at low torques). The permanent thrust bearing ensures proper operation for long periods of time.

While preferred embodiments of the invention have been shown and described, it will be apparent to those skilled in the art that changes can be made without departing from the principles and spirit of the invention, the scope of which is defined in the appended claims.

The invention claimed is:

1. A torque absorber for a submergible pump or the like, comprising inner and outer cylindrical members relatively rotatable to a limited extent about a longitudinal axis, said outer member having an internal annular collar engaging the outer surface of said inner member, said inner member having an external annular collar engaging the inner surface of said outer member, said collars being spaced from each other, a thrust bearing between said inner and outer members in the space between said collars, said inner member having outwardly directed projections and said outer member having inwardly directed projections interdigitated with the projections of the inner member and spaced therefrom circumferentially of said inner and outer members, and torque absorbing elements located in the spaces between the adjacent projections of the inner and outer members, respectively.

2. A torque absorber in accordance with claim 1, wherein said thrust bearing comprises a ring supported upon an end of the projections of one of said members, an annular bearing surface of one of said collars, and bearing elements between said surface and said ring.

3. A torque absorber in accordance with claim 2, wherein said members are tubes of a discharge conduit and wherein said inner member extends through one end of said outer member for supporting the pump thereon.

4. A torque absorber in accordance with claim 3, further comprising retainer means for preventing axial separation of said inner member relative to said outer member.

5. A torque absorber in accordance with claim 4, wherein said retainer means comprises a ring fitting within mating circumferential grooves of said inner and outer members.

6. A torque absorber in accordance with claim 5, wherein said groove of said inner member is defined between an end surface of said inner member and a shoulder of a further ring detachably connected to an end of said inner member.

7. A torque absorber in accordance with claim 3, further comprising circumferential sealing means between said internal collar and the adjacent surface of said inner member.

8. A torque absorber in accordance with claim 7, further comprising circumferential sealing means between said external collar and the adjacent surface of said outer member.

9. A torque absorber in accordance with claim 8, wherein said outer member has means providing a sleeve within said inner member, with a circumferential seal therebetween.

10. A torque absorber in accordance with claim 1, wherein said torque absorbing elements are resiliently compressible blocks.

11. A torque absorber in accordance with claim 10, wherein said blocks have corrugated surfaces engaging said projections.

12. A torque absorber for a submergible pump or the like, comprising inner and outer cylindrical tubular members forming a discharge conduit for said pump, one of said members having means for suspending said pump therefrom, said inner member having outwardly directed projections, said outer member having inwardly directed projections interdigitated with the projections of the inner member and spaced therefrom circumferentially of said inner and outer members, torque absorbing elements located in the spaces between the adjacent projections of the inner and outer members, respectively, said inner and outer members being relatively rotatable to a limited extent about their longitudinal axis, and fluid seal means between said members.

13. A torque absorber in accordance with claim 12, wherein said inner member is adapted to be inserted into said outer member through one end thereof, said inner and outer members having mating thrust bearing surfaces and means for preventing separation of said members.

* * * * *